United States Patent Office 3,099,604
Patented July 30, 1963

3,099,604
METHOD OF PRODUCING L-THREONINE
BY FERMENTATION
Shukuo Kinoshita and Hirotoshi Samejima, Tokyo, Chuzo Fujita, Sagamihara-shi, and Takashi Nara, Tokyo, Japan, assignors to Kyowa Hakko Kogyo Co., Ltd., Tokyo, Japan, a corporation of Japan
No Drawing. Filed May 25, 1961, Ser. No. 112,543
Claims priority, application Japan May 27, 1960
19 Claims. (Cl. 195—29)

This invention relates to a method of producing L-threonine by fermentation which comprises producing and accumulating L-threonine by culturing specific microorganisms in a medium and thereto adding L-homoserine or materials thereof at the time when the culture is commenced or proper period after the commencement and isolating and recovering L-threonine thereof.

Since L-threonine is an intermediate metabolism product of isoleucine biochemically, it is used in general for biosynthesis of isoleucine again or is used as a material for constructing protein, when L-threonine once produced in the medium. Accordingly, it is difficult to accumulate a large quantity of L-threonine out of mycelium by culturing microorganisms. Also it is known that enzymatic system, which has a connection with biosynthesis of L-threonine from L-homoserine, is disturbed by the presence of various kinds of amino acids. (Archives Biochemica, Biophysica 78, 416, 1958.) The methods for producing various amino acids by fermentation are widely studied lately, however, about the production of L-threonine from L-homoserine by direct fermentation of microorganisms, no method is reported but using a mutant of *Bacillus substilis*. (Amino Acids, No. 1, 74, 1959.)

The inventors of the present invention, as a result of various researches upon a production of L-threonine by every kind of microorganisms, have discovered the fact specific microorganisms described hereafter had accumulated a large quantity of L-threonine in a medium when they were grown up in the mediums containing L-homoserine. And also found that these microorganisms varied in activity of L-threonine accumulation enzymatic system in cells according to the period of growth as well as varied in accumulating ability of L-threonine by the time of addition of L-homoserine to the medium. Accordingly we have found that a large quantity of L-threonine can be accumulated in the medium by selecting the time of addition of L-homoserine depending upon microorganisms.

The present invention is based on the above-mentioned facts newly discovered. It is an object of the present invention to produce L-threonine at a low cost by fermentation. This amino acid is essential for animal nutrition.

As for the microorganisms used in the present invention are such as: *Brebibacterium linens, Brevibacterium vitarumen, Brevibacterium liticum, Micrococcus rubens, Micrococcus varians, Xanthomonas pruni, Sarcina lutea, Corynebacterium rathayi* (these are called as the first group hereafter) and *Micrococcus glutamicus, Vibrio percolans, Xanthomonos citri* and *corynebacterium simplex* (these are called as the second group hereafter), and one or more of microorganisms selected from them are used. And the most effective time for adding L-homoserine is just after the microorganisms has commenced to increase logarithmically in case of microorganisms of the first group and it generally is during 6 to 48 hours after the cultivation has begun. When L-homoserine or materials containing thereof is added during this period, it is converted to L-threonine and may be obtained in high yields. While, when L-homoserine is contained in the medium at the beginning of cultivation or is added at early time of the culture, the accumulation of L-threonine becomes small.

On the other hand, in case of the second group of microorganisms aforesaid, considerable amount of L-threonine is accumulated even when L-homoserine is contained or added at the beginning of the cultivation. However, in order to obtain higher yields, it is preferable to add L-homoserine or the materials thereof successively during 6 to 60 hours after commencement of the cultivation. At this time, it is more effective to add carbon source described hereafter together with L-homoserine. Furthermore, as for a culture medium used to accumulate a large quantity of L-threonine from L-homoserino cultivating these microorganisms, either of organic medium or synthetic medium is available so far as the medium contains proper nutrient necessary to general microorganisms such as carbon source, nitrogen source, inorganic substances etc.

As for the carbon sources, various kinds of carbohydrate materials such as glucose, fructose, sucrose, maltose, glycerol, mannitol, sorbitol, hydrolysate of starch, waste molasses and the like are available. These carbon sources may be added to the medium by the total amount at the beginning of the cultivation or may be added during the process of cultivation one after another. Also, organic acids, such as gluconic acid, 2-keto gluconic acid, fumaric acid, citric acid, lactic acid, malic acid, itaconic acid, aconitic acid, succinic acid, pyruvi acid and the like may be used alone or together with the carbohydrate materials.

The nitrogen sources may be such as ammonia, ammonium sulfate, ammonium chloride, ammonium phosphate, nitrate, urea and other nitrogen containing organic substances, such as peptone, NZ-amine, meat extract, yeast extract, corn steep liquor, casein, fish meal, soy bean, residue of fermentation and the like or hydrolysates thereof.

The inorganic substances may be potassium dihydrogen phosphate, potassium hydrogen phosphate, magnesium sulfate, calcium carbonate and the like.

Also, L-homoserine to be added to the medium may be materials containing L-homoserine for instance L-homoserine-containing culture solution obtained by culturing microorganisms or concentrated substances thereof as well as chemically pure L-homoserine. The amount of addition is preferable to be about 5 to 20 mg. of L-homoserine per 1 ml. of the medium.

The fermentation is carried out under aerobic condition by shaking or aeration and agitation. The cultivating temperature is from 24° to 37° C., especially around 30° C. is preferable. During cultivation, the pH of the medium tends to increase more than 7, however, in order to attain high yield of L-threonine, it is perferable to be adjust within a range of between 4 and 7, by using a proper neutralizing agent. The neutralizing agents are mineral acids such as hydrochloric acid or sulfuric acid, various organic acids or calcium carbonate and the like may be used. When the pH of the medium becomes more than 7, L-threonine, once produced, is observed to be decomposed.

After completion of the cultivation by the process above-mentioned, L-threonine is recovered from the culture solution according to the method set forth in Example 2 or other well known procedure.

The following examples are given to illustrate the invention.

EXAMPLE 1

After a culture medium (pH 8.0) containing, 10% of glucose, 2% of ammonium sulfate, 0.5% of yeast extract, 0.2% of peptone, 0.1% of potassium dihydrogen phosphate and 0.03% of magnesium sulfate was sterilized, calcium carbonate which had been dry-heat sterilized separately was so added as to become 2%. Each microorganism shown in Table 1 was inoculated to this fermentation medium and cultivated under aerobic condition at 30° C. L-homoserine was added to the medium at the beginning and 24 hours cultivation, so that the concentration in the medium was 5 mg./ml., and then was further cultured for 48 hours. After completion of the cultivation, accumulated amount of L-threonine in the culture solution was determined by microbiological assay, the results of which were shown in Table 1.

Table 1

ACCUMULATED AMOUNT OF L-THREONINE IN THE MEDIUM

| Microorganisms used | Time of addition | |
| --- | --- | --- |
| | At the beginning culture | At 24 hours after commencement |
| Brevibacterium linens | 0.2 | 1.8 |
| Brevibacterium vitarumen | 0.3 | 1.6 |
| Brevibacterium liticum | 0.56 | 1.0 |
| Micrococcus glutamicus | 1.2 | 2.4 |
| Micrococcus rubens | 0.2 | 1.1 |
| Micrococcus varians | 0.18 | 1.3 |
| Vibrio percolans | 1.0 | 2.0 |
| Xanthomonas citri | 0.9 | 2.8 |
| Xanthomonas pruni | 0.2 | 2.4 |
| Sarcina lutea | 0.3 | 0.7 |
| Corynebacterium rathayi | 0.2 | 1.1 |
| Corynebacterium simplex | 1.5 | 1.8 |

EXAMPLE 2

Vibrio percolans was inoculated to the same fermentation medium as in Example 1, and was cultivated under aerobic condition at 30° C. L-homoserine was added to the medium after 24 hours cultivation so that the concentration was 5 mg./ml., and was further cultivated for 48 hours.

After completion of the cultivation, the culture solution was filtered to remove mycelium. 1 l. of resultant filtrate (containing L-threonine 4.6 mg./ml.) was adjusted at a pH of 2.0 by adding 6 N-hydrochloric acid. This was fed to a resin column packed with strong acidic sulfonic acid type cation exchange resin [Diaion SK #1 (name of a product of Mitsubishi Chemical Industry Co., Japan)], which had previously been converted to H-form by washing with 2-N hydrochloric acid, then L-threonine was absorbed on the resin. After the resin was washed with water the resin was eluted with 3.5% of aqueous ammonia, and ninhydrin-reaction positive fraction was collected.

Free ammonia was removed off by the concentration under reduced pressure at a temperature below 50° C., then was further concentrated after decolorized with active carbon. When ethyl alcohol was added to the resultant concentrated solution, white powdery L-threonine crystallized, which was separated by filtration and dried. 4 gr. of the first crop of crude crystal of L-threonine was obtained. Purity of this crystal was 91% as determined by microbiological assay.

EXAMPLE 3

To the same fermentation medium as described in Example 1, Xanthomonas citri was inoculated and was cultured under aerobic condition. L-homoserine was added at 0, 6, 12, 18, 24, 32, 48 hours' cultivation, respectively so that the concentration was 4 mg./ml. and was cultured for another 48 hours. After completion of the cultivation, the amount of accumulated L-threonine, determined by microbiological assay, was indicated in Table 2.

Table 2

| Time of addition (hours): | Accumulated amount of L-threonine (mg./ml.) |
| --- | --- |
| 0 | 0.2 |
| 6 | 1.5 |
| 12 | 2.0 |
| 18 | 2.0 |
| 24 | 2.8 |
| 32 | 3.1 |
| 48 | 0.9 |

It is clear from Table 2, that the time for adding L-homoserine is preferably 6 to 48 hours' cultivation.

EXAMPLE 4

To the same fermentation medium as described in Example 1, Xanthomonas citri was inoculated. From 24 hours cultivation, L-homoserine was added to the medium 4 times separately with the interval of 12 hours so that the concentration became 2.5 mg./ml. The amount of accumulated L-threonine in the medium at 96 hours after commencement of the culture was 6 mg./ml., determined by microbiological assay. On the other hand, 2% of glucose was added simultaneously with the addition of L-homoserine in the abovementioned process and 8.5 mg./ml. of L-threonine culture solution was obtained.

EXAMPLE 5

A material containing L-homoserine was prepared by concentrating a fermentation solution containing L-homoserine (containing 50 mg/ml. of L-homoserine) which had been obtained by culturing Micrococcus glutamicus No. 534-Co-147 strain (L-threonine requiring strain ATCC No. 14296).

To the same fermentation medium as described in Example 1, Xanthomonas citri was inoculated and was cultured under aerobic condition at 30° C. After 24 hours' cultivation, said material containing L-homoserine was added to the medium so that the concentration of L-homoserine became 5 mg./ml. and was further cultured for 48 hours. After completion of the cultivation, accumulated amount of L-threonine was 3 mg./ml. determined by microbiological assay.

What we claim is:

1. A method of producing L-threonine which comprises (a) culturing at a temperature from 24° to 37° C. and at a pH from 4 to 7 a microorganism selected from the group consisting of Brevibacterium linens, Brevibacterium vitarumen, Brevibacterium liticum, Micrococcus rubens, Micrococcus varians, Xanthomonas pruni, Sarcina lutea and Corynebacterium rathayi in culture medium containing carbon source, nitrogen source and inorganic salt, (b) introducing L-homoserine into the medium at a proper time within the period from 6 to 48 hours after cultivation commences, and (c) accumulating L-threonine in the medium.

2. A method of producing L-threonine which comprises (a) culturing Brevibacterium linens at a temperature from 24° to 37° C. and at a pH from 4 to 7 in culture medium containing carbon source, nitrogen source and inorganic salt, (b) introducing L-homoserine into the medium directly after the Brevibacterium linens commences to increase logarithmically, and (c) accumulating L-threonine in the medium.

3. A method of producing L-threonine which comprises (a) culturing Brevibacterium vitarumen at a temperature from 24° to 37° C. and at a pH from 4 to 7 in culture medium containing carbon source, nitrogen source and inorganic salt, (b) introducing L-homoserine into the medium directly after the Brevibacterium vitarumen commences to increase logarithmically, and (6) accumulating L-threonine in the medium.

4. A method of producing L-threonine which comprises (a) culturing *Brevitacterium liticum* at a temperature from 24° to 37° C. and at a pH from 4 to 7 in culture medium containing carbon source, nitrogen source and inorganic salt, (b) introducing L-homoserine into the medium directly after the *Brevibacterium liticum* commences to increase logarithmetically, and (c) accumulating L-threonine in the medium.

5. A method of producing L-threonine which comprises (a) culturing *Micrococcus rubens* at a temperature from 24° to 37° C. and at a pH from 4 to 7 in culture medium containing carbon source, nitrogen source and inorganic salt (b), introducing L-homoserine into the medium directly after the *Micrococcus rubens* commences to increase logarithmically, and (c) accumulating L-threonine in the medium.

6. A method of producing L-threonine which comprises (a) culturing *Micrococcus varians* at a temperature from 24° to 37° C. and at a pH from 4 to 7 in culture medium containing carbon source, nitrogen source and inorganic salt, (b) introducing L-homoserine into the medium directly after the *Micrococcus varians* commences to increase logarithmically, and (c) accumulating L-threonine in the medium.

7. A method of producing L-threonine which comprises (a) culturing *Xanthomonas pruni* at a temperature from 24° to 37° C. and at a pH from 4 to 7 in culture medium containing carbon source, nitrogen source and inorganic salt, (b) introducing L-homoserine into the medium directly after the *Xanthomonas pruni*-commences to increase logarithmically, and (c) accumulating L-threonine in the medium.

8. A method of producing L-threonine which comprises (a) culturing *Sarcina lutea* at a temperature from 24° to 37° C., and at a pH from 4 to 7 in culture medium containing carbon source, nitrogen source and inorganic salt, (b) introducing L-homoserine into the medium direct after the *Sarcina lutea* commences to increase logarithmically, and (c) accumulating L-threonine in the medium.

9. A method of producing L-threonine which comprises (a) culturing *Corynebacterium rathayi* at a temperature from 24° to 37° C. and at a pH from 4 to 7 in culture medium containing carbon source, nitrogen source and inorganic salt, (b) introducing L-homoserine into the medium directly after the *Corynebacterium rathayi* commences to increase logarithmically, and (c) accumulating L-threonine in the medium.

10. A method for producing L-threonine which comprises (a) culturing at a temperature from 24° to 37° C. and at a pH from 4 to 7 a microorganism selected from the group consisting of *Micrococcus glutamicus, Vibrio percolans, Xanthomonas citri* and *Corynebacterium simplex* in culture medium containing carbon source, nitrogen source and inorganic salt, (b) introducing L-homoserine into the medium prior to the start of the cultivation, and (c) accumulating L-threonine in the medium.

11. A method for producing L-threonine which comprises (a) culturing *Micrococcus glutamicus* at a temperature from 24° to 37° C. and at a pH from 4 to 7 in culture medium containing carbon source, nitrogen source and inorganic salt, (b) introducing L-homoserine into the medium prior to the start of the cultivation, and (c) accumulating L-threonine in the medium.

12. A method for producing L-threonine which comprises (a) culturing *Vibrio percolans* at a temperature from 24° to 37° C. and at a pH from 4 to 7 in culture medium containing carbon source, nitrogen source and inorganic salt, (b) introducing L-homoserine into the medium prior to the start of the cultivation, and (c) accumulating L-threonine in the medium.

13. A method for producing L-threonine which comprises (a) culturing *Xanthomonas citri* at a temperature from 24° to 37° C. and at a pH from 4 to 7 in culture medium containing carbon source, nitrogen source and inorganic salt, (b) introducing L-homoserine into the medium prior to the start of the cultivation, and (c) accumulating L-threonine in the medium.

14. A method for producing L-threonine which comprises (a) culturing *Corynebacterium simplex* at a temperature from 24° to 37° and at a pH from 4 to 7 in culture medium containing carbon source, nitrogen source and inorganic salt, (b) introducing L-homoserine into the medium prior to the start of the cultivation, and (c) accumulating L-threonine in the medium.

15. A method for producing L-threonine which comprises (a) culturing at a temperature from 24° to 37° C. and at a pH from 4 to 7 a microorganism selected from the group consisting of *Micrococcus glutamicus, Vibrio percolans, Xanthomonas citri* and *Corynebacterium simplex* in culture medium containing carbon source, nitrogen source and inorganic salt, (b) introducing L-homoserine into the medium during the cultivation, and (c) accumulating L-threonine in the medium.

16. A method for producing L-threonine which comprises (a) culturing *Micrococcus glutamicus* at a temperature from 24° to 37° C. and at a pH from 4 to 7 in culture medium containing carbon source, nitrogen source and inorganic salt, (b) introducing L-homoserine into the medium in successively added portions during the period from 6 to 60 hours after cultivation commencement, and (c) accumulating L-threonine in the medium.

17. A method for producing L-threonine which comprises (a) culturing *Vibrio percolans* at a temperature from 24° to 37° C. and at a pH from 4 to 7 in culture medium containing carbon source, nitrogen source and inorganic salt, (b) introducing L-homoserine into the medium in successively added portions during the period from 6 to 60 hours after cultivation commencement, and (c) accumulating L-threonine in the medium.

18. A method for producing L-threonine which comprises (a) culturing *Xanthomonas citri* at a temperature from 24° to 37° C. and at a pH from 4 to 7 in culture medium containing carbon source, nitrogen source and inorganic salt, (b) introducing L-homoserine into the medium in successively added portions during the period from 6 to 60 hours after cultivation commencement, and (c) accumulating L-threonine in the medium.

19. A method for producing L-threonine which comprises (a) culturing *Corynebacterium simplex* at a temperature from 24° to 37° C. and at a pH from 4 to 7 in culture medium containing carbon source, nitrogen source and inorganic salt, (b) introducing L-homoserine into the medium in successively added portions during the period from 6 to 60 hours after cultivation commencement, and (c) accumulating L-threonine in the medium.

No references cited.